United States Patent [19]

Seiden et al.

[11] Patent Number: 4,732,767

[45] Date of Patent: Mar. 22, 1988

[54] METHOD FOR REDUCING CHIP BLEED IN BAKED GOODS

[75] Inventors: Paul Seiden, Cincinnati, Ohio; Susie H. Mills, Ft. Thomas, Ky.; Edward D. Smith, III; Martin A. Mishkin, both of Cincinnati, Ohio

[73] Assignee: The Procter & Gamble Company, Cincinnati, Ohio

[21] Appl. No.: 849,972

[22] Filed: Apr. 10, 1986

[51] Int. Cl.$^4$ .............................................. A21D 2/16
[52] U.S. Cl. ...................................... 426/94; 426/549; 426/553; 426/653; 426/654
[58] Field of Search ................. 426/94, 549, 553, 654, 426/653

[56] References Cited

U.S. PATENT DOCUMENTS

| | | | |
|---|---|---|---|
| 2,689,797 | 9/1954 | Joffe | 426/549 |
| 2,975,059 | 3/1961 | Andrews | |
| 3,216,829 | 11/1965 | Hansen | |
| 3,268,337 | 8/1966 | Howard et al. | 426/549 |
| 3,443,965 | 5/1969 | Birnbaum | 426/654 |
| 3,502,482 | 3/1970 | Birnbaum | |
| 3,533,802 | 10/1970 | Cooper et al. | 426/549 |
| 4,229,480 | 10/1980 | Suggs et al. | 426/653 X |
| 4,344,969 | 8/1982 | Youngquist et al. | 426/549 X |
| 4,360,534 | 11/1982 | Brabbs et al. | 426/560 |
| 4,374,863 | 2/1983 | Savage | 426/553 |
| 4,455,333 | 6/1984 | Hong et al. | 426/94 |
| 4,483,880 | 11/1984 | Koizumi et al. | 426/653 X |
| 4,503,080 | 3/1985 | Brabbs et al. | 426/94 |
| 4,514,430 | 4/1985 | Hartman | 426/549 |
| 4,609,560 | 9/1986 | Yuda et al. | 426/653 |

FOREIGN PATENT DOCUMENTS 163496  5/1985  European Pat. Off.

OTHER PUBLICATIONS

Wootton et al., Chem. Ind. 32. 1052–1053 (1970).
Wacquez, J., "Fat Migration into Enrobing Chocolate", The Manufacturing Confectioner 55, pp. 19–23, 26 (1975).
Abstract, Japanese Patent Application 1089-886, published 1975.
Hutchinson et al., "Effect of Emulsifiers on the Texture of Cookies", J. Food Sci. 42(2), pp. 399–401 (1977).

*Primary Examiner*—Joseph Golian
*Attorney, Agent, or Firm*—Gary M. Sutter; Rose Ann Dabek; Richard C. Witte

[57] ABSTRACT

This invention is a method for reducing chip bleed in flavor-chip containing baked goods, particularly in cookies. "Chip bleed" is a migration of material from the chip into the dough or crumb of the baked good.

The method comprises adding to the dough from about 0.5% to about 5% of an emulsifier which is predominantly crystalline at room temperature to form a stable dough emulsion. The emulsifier is selected from: (a) fatty acid mono-diglycerides having from about 35% to about 99% monoglycerides and from about 1% to about 50% diglycerides, wherein at least about 65% of the fatty acids are selected from $C_{16}$–$C_{18}$ saturated fatty acids and $C_{18}$ trans-unsaturated fatty acids; (b) polyol esters having an average of from about 4 to about 14 hydroxyl groups, wherein from about 10% to about 66% of the hydroxyl groups are esterified, and wherein at least about 65% of the fatty acids are selected from $C_{16}$–$C_{18}$ saturated fatty acids and $C_{18}$ trans-unsaturated fatty acids; and (c) monoglyceride esters of polycarboxylic acids selected from diacetylated tartaric acid esters of monoglycerides, citric acid esters of monoglycerides, succinylated monoglycerides, ethoxylated monoglycerides, lactylated monoglycerides, and mixtures thereof, wherein at least about 65% of the fatty acids are selected from $C_{16}$–$C_{18}$ saturated fatty acids.

In chocolate chip cookies, a flavor advantage is achieved by giving the base cake and chocolate chips independent flavors, instead of diluted and altered flavors of chocolate bleed into the base cake dough. An appearance advantage stems from the dough color now being lighter and distinct from the brown color of the chocolate chips.

16 Claims, No Drawings

METHOD FOR REDUCING CHIP BLEED IN BAKED GOODS

TECHNICAL FIELD

The field of this invention is baked goods which contain flavor chips such as chocolate chips. In particular, this invention relates to a method for preventing chip material from migrating into the dough during the processing and baking of cookies.

BACKGROUND ART

A number of references discuss interactions between fats and emulsifiers in baked goods.

M. Wootton et al., *Chem. Ind.* 32, 1052–53 (1970), describe the mechanism of fat migration in chocolate enrobed goods. The article indicates that migration of fat from a biscuit base into enrobing chocolate is related to the liquid fat content of the biscuit.

British Pat. No. 855,310 to Radley (Ilford, Ltd., 1960) relates to the use of emulsifiers to reduce the viscosity of chocolate.

Japanese Patent Application No. 89,886 (1975) discloses the use of a sucrose fatty acid ester at levels of up to 0.3% to emulsify fat and oil in sugar syrup. Candies made thereby do not stick to teeth.

U.S. Pat. No. 3,533,802 to Cooper et al. (CPC International, 1970) describes a stable oil in water emulsion containing shortening, an aqueous sugar solution, and up to 2.5% water-soluble or water-dispersible emulsifiers. The emulsions are taught for use in producing baked goods, including cookies.

None of these references addresses the issue of chip bleed into baked good dough. It is therefore an object of this invention to provide a method for reducing chip bleed in baked goods.

It is another object of this invention to reduce chip bleed by forming a dough emulsion which is resistant to chip bleed.

These and other objects of the invention will become apparent by the description of the invention below.

All percentages are by weight unless otherwise defined.

SUMMARY OF THE INVENTION

The invention is a method for reducing chip bleed in a baked good made from dough containing shortening, comprising adding to the dough from about 0.5% to about 5% (based on the amount of shortening) of an emulsifier which is predominantly crystalline at room temperature, said emulsifier being selected from the group consisting of:

(a) fatty acid mono-diglycerides having from about 35% to about 99% fatty acid monoglycerides and from about 1% to about 50% fatty acid diglycerides, wherein at least about 65% of said fatty acids are selected from the group consisting of $C_{16}$–$C_{18}$ saturated fatty acids and $C_{18}$ trans-unsaturated fatty acids and mixtures thereof;

(b) fatty acid esters of polyols having an average of from about 4 to about 14 hydroxyl groups, wherein from about 10% to about 66% of the hydroxyl groups are esterified, and wherein at least about 65% of said fatty acids are selected from the group consisting of $C_{16}$–$C_{18}$ saturated fatty acids and $C_{18}$ trans-unsaturated fatty acids and mixtures thereof;

(c) fatty acid monoglyceride esters of polycarboxylic acids and their derivatives selected from the group consisting of diacetylated tartaric acid esters of monoglycerides, citric acid esters of monoglycerides, succinylated monoglycerides, ethoxylated monoglycerides, lactylated monoglycerides, and mixtures thereof, wherein at least about 65% of said fatty acids are selected from the group consisting of $C_{16}$–$C_{18}$ saturated fatty acids and mixtures thereof; and (d) mixtures thereof.

DETAILED DESCRIPTION OF THE INVENTION

The present invention provides a method for reducing chip bleed in flavor chip-containing baked goods.

A number of popular baked good formulations contain flavor chips. These include chocolate chip or Toll House ® cookies, as well as oatmeal and other cookies containing peanut butter, mint chocolate, butterscotch, and other flavored chips. These chips are composed of fat (typically cocoa butter or a synthetic substitute), sugars, and flavoring materials.

Baked goods containing flavor chips may experience varying amounts of chip bleed. "Chip bleed" is a migration of material from the chip into the dough or crumb of the baked good. For example, in chocolate chip cookies some of the chocolate chip material may be lost from the chip itself and become part of the cookie dough, causing a darkening in color of the dough.

As a model, chocolate chips can generally be viewed as suspensions of discrete particles such as sugar crystals and cocoa powder within a fat-continuous matrix. Anything which disrupts this fatty support matrix will result in a loss of both the fat and its suspended solids. While not intended to be bound by theory, one mechanism thought to be involved in chip bleed is the softening or dissolution of the surface chip fat by free oil in the dough. This results in erosion of the chip material at the surface during dough mixing. Another factor is thought to be friction at the surface of the chips by sucrose particles in the dough during mixing.

Higher temperature, more agitation or mixing of the dough and chips, and softer chips promote increased chip bleed. At a temperature above the melting point of the fat of the flavor chip (in the case of cocoa butter, approximately 94° F. [34° C.]), chip bleed is rapid and is difficult to prevent because the melted fat readily migrates into the dough.

Chip bleed can be measured as a darkening of the dough (as measured by L-color) for chips with pigmented components, or calculated by weight percent chip material that has migrated into the dough. The darkening in dough color is detrimental to the appearance of the cookie. Additionally, chip bleed can impart a negative flavor to the dough which, when combined with other elements, overpowers the baked good's positive flavor notes. Even small amounts of chip bleed can result in measurable flavor loss of the flavor of the crumb. Hence, there is a need for a method for reducing the amount of chip bleed in flavor chip-containing baked goods.

It has now been discovered that chip bleed can be reduced by incorporating into the baked good dough from about 0.5% to about 5% (based on the amount of shortening) of a particular emulsifier which forms a stable oil-in-water emulsion in the dough at room temperature. A suitable emulsifier is predominantly crystalline rather than liquid at room temperature (70° F., 21° C.), to form a sufficiently stable emulsion. Preferably, it will be at least about 70% crystalline at room temperature.

Suitable emulsifiers for use in this invention are selected from the group consisting of: (a) fatty acid mono-diglycerides having from about 35% to about 99% fatty acid monoglycerides and from about 1% to about 50% fatty acid diglycerides, wherein at least about 65% of said fatty acids are selected from the group consisting of $C_{16}$–$C_{18}$ saturated fatty acids and $C_{18}$ trans-unsaturated fatty acids and mixtures thereof; (b) fatty acid esters of polyols having an average of from about 4 to about 14 hydroxyl groups, wherein from about 10% to about 66% of the hydroxyl groups are esterified, and wherein at least about 65% of said fatty acids are selected from the group consisting of $C_{16}$–$C_{18}$ saturated fatty acids and $C_{18}$ trans-unsaturated fatty acids and mixtures thereof; (c) fatty acid monoglyceride esters of polycarboxylic acids and their derivatives selected from the group consisting of diacetylated tartaric acid esters of monoglycerides, citric acid esters of monoglycerides, succinylated monoglycerides, ethoxylated monoglycerides, lactylated monoglycerides, and mixtures thereof, wherein at least about 65% of said fatty acids are selected from the group consisting of $C_{16}$–$C_{18}$ saturated fatty acids and mixtures thereof; and (d) mixtures thereof.

The emulsifier ties up the oil and syrup phases of the baked good dough in a stable emulsion, so they are less available to solubilize the chip components. For maximum effectiveness at tying up the oil and syrup phases, the baked good dough should be well-emulsified in a tight emulsion, that is, an emulsion having small droplets arranged uniformly throughout the dough.

Generally, shortening is heated and the emulsifier is added to the shortening, and they are mixed together into the dough. However, this invention is not limited by the method of incorporating the emulsifier into the dough. The emulsifier can be applied directly into the dough as a hydrate or in dry form.

As used herein the terms "fatty acid monoglyceride" and "fatty acid diglyceride" mean mixtures of the esters of glycerol and fatty acids. The term "fatty acid mono-diglyceride" as used herein means a mixture of fatty acid monoglycerides and fatty acid diglycerides, with minor amounts of triglycerides and free glycerol. Monoglycerides are more functional than diglycerides. Since the monoglyceride content of mono-diglyceride can vary, the percentages of mono-diglyceride in the emulsifier system are given by weight on the basis of monoglyceride content.

The fatty acid mono-diglyceride comprises from about 35% to about 99% fatty acid monoglycerides and from about 1% to about 50% fatty acid diglycerides, with small amounts of triglycerides and free glycerol. At least about 65% of the fatty acids are selected from the group consisting of $C_{16}$–$C_{18}$ saturated fatty acids and $C_{18}$ trans-unsaturated fatty acids and mixtures thereof.

As discussed above, the emulsifier is predominantly crystalline at room temperature to be able to form an emulsion stable enough to reduce chip bleed. While it is important to reduce chip bleed, it is also important that the baked good product have an acceptable taste and texture, so the emulsifier must satisfy the taste and texture requirements of the final product as well. Although they can be effective in reducing chip bleed, high melting emulsifiers produce disadvantages in the areas of texture and taste, and in particular they impart a more waxy taste to the food. Therefore, intermediate melting emulsifiers are preferred for use in this invention.

Preferably, from about 25% to about 85% of the fatty acids (of the mono-diglycerides and the polyol esters) are $C_{18}$ trans-unsaturated fatty acids and less than about 18% of the fatty acids (of the mono-diglycerides and the polyol esters) are selected from the group consisting of octadecadienoic acid and octadecatrienoic acid and mixtures thereof. Most preferably, from about 25% to about 70% of the fatty acids (of the mono-diglycerides and the polyol esters) are $C_{18}$ trans-unsaturated fatty acids and less than about 8% of the fatty acids (of the mono-diglycerides and the polyol esters) are selected from the group consisting of octadecadienoic acid and octadecatrienoic acid and mixtures thereof.

In general, the fatty acids are a major amount of saturated fatty acids or trans-unsaturated fatty acids, or a combination thereof. The melting point of the emulsifier will largely depend on the particular composition of the fatty acids. As one skilled in the art will recognize, the presence of a large amount of low melting cis-unsaturated fatty acids will depress the melting point of the emulsifier. The trans-isomers are higher melting and thus elevate the melting point of the mixture. Through multiple solvent crystal fractionation the cis and trans isomers of fatty acids can be partially separated by crystallizing out most of the intermediate-melting trans isomers. For the emulsifiers used herein it is preferred that the fatty acids be fractionated to be enriched in the intermediate-melting trans and cis-isomers and reduced in the lower melting cis isomers (for example, those having double bonds in the 5, 7, 9, and 11 positions of the fatty acid chain).

Even the position of the double bond within the fatty acid chain affects the melting point of the emulsifier. The presence of large amounts of stearic acid mono- and diglycerides will elevate the melting point of the emulsifier since these materials melt higher than the corresponding palmitic acid and oleic acid esters. Because of its lower melting point, the level of octadecadienoic acid and octadecatrienoic acid, and mixtures thereof, in the emulsifier should preferably be less than about 18%, and most preferably less than about 8%.

Preferably, from about 60% to about 90% of the fatty acids (of the mono-diglycerides) are selected from the group consisting of myristic, palmitic, stearic, and trans-octadecenoic acids, and mixtures thereof. Also preferred are emulsifiers in which from about 10% to about 40% of the fatty acids (of the mono-diglycerides) are selected from the group consisting of myristic, palmitic, and stearic acids and mixtures thereof, and in which from about 2% to about 25% of the fatty acids (of the mono-diglycerides) are stearic acid.

The polyol esters preferred for use herein are partial esters of polyglycerol and sucrose, and mixtures thereof. Polyglycerols are prepared by the polymerization of glycerine in the presence of either acid or base. The polyglycerol compounds can be made by any synthetic method; see, for example, U.S. Pat. No. 3,968,169 issued to Seiden and Martin (1976). The method for making the polyglycerols is not critical to the present invention.

The polyols are reacted with fatty acids to produce fatty acid esters. The polyol has an average of from about 4 to about 14 hydroxyl groups, and preferably from about 4 to about 12 hydroxyl groups. Sucrose, for example, has eight hydroxyls. The polyol is esterified with fatty acids selected from the group consisting of $C_{14}$–$C_{20}$ saturated fatty acids and $C_{16}$–$C_{20}$ trans-unsaturated fatty acids and mixtures thereof. The fatty acids control both the melting point of the polyol ester and the functionality. For this reason, polyol fatty acid ester made from palmitic and stearic acids, and mixtures thereof, are preferred for use herein.

The polyglycerol esters must have an average of from about two to about twelve, and preferably from about three to about ten, glycerol units per polyglycerol moiety. The percentage of hydroxyl groups esterified with fatty acid is from about 10% to about 66%, and preferably from about 20% to about 50%.

The saponification value of the polyglycerol esters is preferably from about 55 to about 175, and most preferably from about 80 to about 160. Saponification value is used to characterize the polyglycerol esters by average molecular weight, which varies with average fatty acid chain length. The hydroxyl value of the polyglycerol esters is preferably from about 80 to about 600, most preferably from about 140 to about 460. The polyglycerol esters preferably contain less than about 20%, most preferably less than 15%, free polyglycerol.

Diacetylated tartaric acid esters of monoglycerides are preferred polycarboxylic acid esters. They must have an acid value of from about 60 to about 80 and a saponification value of from about 380 to about 430. Diacetylated tartaric acid esters of monoglycerides have a dual function in cookies because (a) they are surface active (i.e., they are effective food emulsifiers); and (b) they also function as leavening acids (i.e., they react with sodium bicarbonate to release carbon dioxide).

The method of this invention is preferably used with cookies, where the emulsifier produces benefits in such areas as texture, flavor display, mouthmelt and taste, dough stability, appearance, and density control, as well as reducing chip bleed. The cookies can be traditional drop cookies or improved crumb-continuous dual-textured crisp and chewy cookies of the type described in U.S. Pat. No. 4,455,333, issued June 19, 1984 to Hong and Brabbs. When used in cookies, the fatty acid mono-diglycerides comprise from about 40% to about 100% of the emulsifier by weight, on the basis of monoglyceride content, and preferably from about 40% to about 90% of the emulsifier. The polyol esters comprise from about 0% to about 60% of the emulsifier (by weight), and preferably from about 5% to about 55%. The polycarboxylic acid esters comprise from about 0% to about 60% (by weight) of the emulsifier, preferably from about 5% to about 55%.

This development is most preferred for use with dual-textured cookies of the type described in U.S. Pat. No. 4,455,333 to Hong and Brabbs (1984). When used with this type of cookie, the inner dough which contains the chips remains much closer to the color of the outer dough. If chip bleed is not controlled, the inner dough color becomes very dark relative to the outer dough color, making it unattractive when visible.

The dual-textured cookies disclosed in the Hong and Brabbs '333 patent are preferably embodied by a sweetened food product prepared from a cookie dough preform, or the like, comprising a matrix made from typical cookie ingredients and being characterized and having distributed therein discrete regions containing readily crystallizable sugar and discrete regions containing crystallization-resistant sugar, whereby the product, when baked, provides a storage-stable plurality of textures, the regions containing crystallized sugar providing a crisp texture, and the regions containing crystallization-resistant sugar providing a chewy texture.

It has been found that when the emulsifier is used in these dual-textured cookies, optimum results are obtained by using all three components in the chewy cookie regions, and by using the mono-diglycerides, alone or with the fatty acid polyol esters, in the crisp cookie regions. In the regions of chewy texture the emulsifier will comprise from about 40% to about 100% of the fatty acid mono-diglycerides, from about 0% to about 60% of the polyol esters, and from about 0% to about 60% of the polycarboxylic acid esters. The most preferred ranges for the emulsifier components in these cookies containing discrete chewy regions and discrete crisp regions are: (a) from about 70% to about 100% mono-diglycerides in the crisp regions, and from about 50% to about 80% of the mono-diglycerides in the chewy regions; (b) from about 0% to about 30% fatty acid esters of polyols in the crisp regions, and from about 10% to about 30% of the fatty acid esters of polyols in the chewy regions; and (c) 0% of the fatty acid esters of polycarboxylic acids in the crisp regions, and from about 10% to about 30% of the fatty acid esters of polycarboxylic acids in the chewy regions.

This invention is particularly advantageous for use with chocolate chip cookies. Chocolate chip bleed is reduced dramatically, yielding a much cleaner cookie base cake flavor and improved appearance. A flavor advantage is achieved by giving the base cake and chocolate chips independent flavors, instead of diluted and altered flavors of chocolate bleed into the base cake dough. An appearance advantage stems from the dough color now being lighter and distinct from the brown color of the chocolate chips.

METHOD FOR MEASURING CHIP BLEED

As previously described, chip bleed is a melting of chip material from a flavor chip into the dough of a baked good. When dual-textured chocolate chip cookies are involved, it is a melting of chocolate from the chips into the inner dough of the cookie. It can be expressed as a darkening in L-color of the inner dough. L-color is on a scale of white to black, with 100 as total white and 0 as total black. A darker dough thus has more chip bleed and a lower L-color. For purposes of this invention, the color of the baked good dough was measured at 70° F. (21° C.) by means of a Hunter Lab D25-9 colorimeter with a type B head. Absolute L-color was found not to be an accurate indicator of chip bleed when initial dough color changes. It was found that change in L-color (delta L-color) between a chip-free dough and a dough with incorporated chips is a more accurate indicator of percent chocolate in the dough. At delta L-colors less than 25 units, the method is very sensitive to chip bleed. Zero chip bleed is expressed as 0 delta L-color. Delta L-color and percent chocolate that has bled into the dough were found to be empirically related by this equation:

$$Y = 45.59 * [1 - 0.961 * \exp(-X/3.5)]$$

where Y = delta L-color and X = percent chocolate that has bled into the dough.

The following examples further illustrate the practice of this invention, while not intending to be limiting thereof.

EXAMPLE 1

A batch of dual-textured crisp and chewy chocolate chip cookies is prepared:

| Ingredients | Weight Percent |
| --- | --- |
| *Outer Dough (First Dough)* | |
| Shortening | 19.0 |
| Mono-diglycerides | 0.6 |
| Water | 9.5 |
| Molasses | 1.5 |
| Baking soda | 0.5 |
| Sugar (sucrose) | 34.5 |
| Egg yolk solids | 1.0 |
| Flour | 32.5 |
| Salt | 0.7 |
| Starch | 0.1 |
| Egg white solids | 0.1 |
| *Inner Dough (Second Dough)* | |
| Shortening | 13.5 |
| Mono-diglycerides | 0.4 |
| Polyglycerol esters | 0.1 |
| Diacetylated tartaric acid esters of monoglycerides | 0.1 |
| Water | 0.5 |
| Baking soda | 0.4 |
| High fructose corn syrup | 22.0 |
| Sugar | 9.0 |
| Flour | 23.1 |
| Salt | 0.5 |
| Starch | 1.3 |
| Egg White solids | 0.1 |
| Chocolate chips | 29.0 |

The outer dough is made by first mixing the water with the molasses and soda. The shortening and distilled monoglyceride are then added and the ingredients are mixed for 3 to 4 minutes. The sugar is then added and the ingredients mixed again. All the remaining ingredients are then mixed in, resulting in a 29.7 lb. batch of dough.

The inner dough is formed by mixing the ingredients in the following order: The high fructose corn syrup and water are mixed, then the shortening, mono-diglycerides, polyglycerol esters, and diacetylated tartaric acid esters of monoglycerides are added and mixed. The sugar is then added and mixed, and then the flour, other dry ingredients, and chocolate chips are mixed in. The inner dough temperature is about 68°–70° F. (20°–21° C.).

The doughs are coextruded with a noncommercial extruder to produce a two-dough, concentrically arranged rope. An equivalent coextruder can be employed such as a Rheon ® encrusting machine, Model 207 available from Rheon Automotive Machinery Company of Japan, or coextruder Model No. DDP 200-9005, available from Bepex Hutt GmbH, Postfach 9, Daimlerstrasse 9, D-7105, Leingarten, West Germany. Then doughballs are formed weighing about 13.4 grams each. The doughballs are placed onto stainless steel trays and baked in a Middleby-Marshall Oven (Model JS250) at 305° F. for about 7.2 minutes to make cookies. The cookies are cooled, packaged, and stored.

The mono-diglyceride component of the emulsifier used in the doughs is a distilled monoglyceride having the following characteristics:
Monoglyceride content—92.8%
Diglyceride content—3.5%
Melting point (approx.)—60° C. (140° F.)
Percentage of trans fatty acids: 61.5%
Fatty acid composition:

| Fatty acid | Percentage |
| --- | --- |
| $C_{16}$ | 9.9 |
| $C_{18}$ | 14.1 |
| $C_{18-1}$ | 72.5 |
| $C_{18-2}$ | 2.6 |
| $C_{20}$ | 0.4 |
| $C_{22}$ | 0.4 |

The polyglycerol ester component of the emulsifier has the following characteristics:
Average of 8 glycerol units per polyglycerol moiety.
Hydroxyl value—394.8
Refractive index (butyro 60° C.)—59.5
Fatty acid composition:
  64%±1.5% palmitic acid ($C_{16}$)
  34%±1.5% stearic acid ($C_{18}$)
Saponification value—about 96.7

The diacetylated tartaric acid ester of monoglyceride component of the emulsifier is characterized as follows:
Saponification value—395–420
Acid value—62–76
Iodine value—maximum of 3
Melting point (approx.)—45° C. (113° F.)

The resulting cookies are visually inspected and the doughs are measured for chip bleed. Melting of chocolate chip material into the inner portion of the dough is seen to be reduced. The inner dough is measured for L-color and change in L-color. The change in L-color of the inner dough is 9.0, indicating that very little chip bleed has occurred.

EXAMPLE 2

Four groups of samples of inner dough for dual-textured chocolate chip cookies are prepared from the following ingredients:

| Dough Ingredients | Weight Percent |
| --- | --- |
| Flour | 31.73 |
| Sugar | 12.49 |
| High fructose corn syrup | 30.82 |
| Shortening | 18.80 |
| Emulsifier | 0.99 |
| Eggs | 2.01 |
| Starch | 2.24 |
| Baking soda | 0.51 |
| Salt | 0.41 |

Besides the dough ingredients, the samples also contain about 15% chocolate chips per weight of the dough. The ingredients are mixed into a dough. The doughs are baked at 305° F. (152° C.) for 7 minutes and then allowed to cool.

The first group of samples, consisting of runs 1 through 5, contains no emulsifier (the percentage of other ingredients are adjusted accordingly). The second group of samples, consisting of runs 6 through 10, contains an emulsifier comprising the following: 60% mono-diglycerides, 20% polyglycerol esters ("PGE"), and 20% diacetylated tartaric acid esters of monoglyceride ("TEM"). The mono-diglyceride (to be termed "MDG-1") is a distilled monoglyceride derived from sunflowerseed oil, and it has an iodine value of 100, a substantial amount of cis unsaturated fatty acids, and a complete melting point of about 105° F. (40° C.).

The third group of samples, consisting of runs 11 through 15, contains the same emulsifier as the second group, except that a different mono-diglyceride is used.

The mono-diglyceride (to be termed "MDG-2") is a distilled monoglyceride derived from fully hydrogenated soybean oil, and it has an iodine value less than or equal to 5 (its fatty acid chains are substantially saturated) and a complete melting point of about 156° F. (69° C.).

The fourth group of samples, consisting of runs 16 through 20, contains an emulsifier consisting solely of distilled monoglyceride. This mono-diglyceride (to be termed "MDG-3") has an iodine value of 60 and a melting point of about 140° F. (60° C.).

Different runs within each group differ in dough mixing time; a longer mix time increases the amount of chip bleed.

Chip bleed in the baked dough pieces is determined by measuring the change in L-color (Delta L) of the dough. The following results are obtained:

| Run | Emulsifier | Mix Time | Delta L |
|---|---|---|---|
| 1 | None | 0 | 0.000 |
| 2 | None | 10 | 13.000 |
| 3 | None | 25 | 18.500 |
| 4 | None | 40 | 23.800 |
| 5 | None | 55 | 29.200 |
| 6 | MDG-1, PGE, TEM | 0 | 0.000 |
| 7 | MDG-1, PGE, TEM | 10 | 4.735 |
| 8 | MDG-1, PGE, TEM | 25 | 12.900 |
| 9 | MDG-1, PGE, TEM | 40 | 19.880 |
| 10 | MDG-1, PGE, TEM | 55 | 24.365 |
| 11 | MDG-2, PGE, TEM | 0 | 0.000 |
| 12 | MDG-2, PGE, TEM | 10 | 5.165 |
| 13 | MDG-2, PGE, TEM | 25 | 5.530 |
| 14 | MDG-2, PGE, TEM | 40 | 8.800 |
| 15 | MDG-2, PGE, TEM | 55 | 9.505 |
| 16 | MDG-3 | 0 | 0.000 |
| 17 | MDG-3 | 15 | 2.800 |
| 18 | MDG-3 | 30 | 8.800 |
| 19 | MDG-3 | 45 | 12.300 |
| 20 | MDG-3 | 60 | 16.100 |

It is seen that the combination of emulsifiers MDG-2, PGE, and TEM is most effective in controlling chip bleed. MDG-3 is almost as effective, and the combination of MDG-1, PGE, and TEM, is less effective. All the emulsifiers are better at controlling chip bleed than no emulsifier at all. MDG-2 is the monodiglyceride having an iodine value less than or equal to 5 (its fatty acid chains are almost totally saturated) and a melting point of 69° C. (156° F.). It is thought that because of its high melting point, MDG-2 is predominantly crystalline at room temperature. Hence, MDG-2 is able to tie up the oil phase and syrup phase in the cookie dough in a stable emulsion, so chip bleed is markedly reduced.

MDG-3 has an IV of 60 (it is mostly saturated), its unsaturated fatty acid chains are about 65% trans-unsaturated, and it has a melting point of 60° C. (140° F.). It is only slightly less effective than MDG-2 at reducing chip bleed.

MDG-1 has an IV of 100 (it is more unsaturated), its unsaturated fatty acid chains are more cis than trans, and its melting point is 40° C. (105° F.). This is its complete melting point; at room temperature the emulsion is predominantly liquid. Because the emulsifier is too liquid at room temperature it is unable to form a sufficiently stable emulsion to tie up the oil and syrup phases of the dough and reduce chip bleed. Hence, MDG-1 is less effective at reducing chip bleed than MDG-2 or MDG-3.

EXAMPLE 3

An experiment is done to test the ability of emulsifiers to trap free oil in cookie doughs. The first dough is prepared as described for runs 1 through 5 in Example 2. The second dough is prepared as described for runs 6 through 10 in Example 2.

A 2.00 gram sample of each dough is placed in the middle of a piece of No. 40 filter paper. Any free oil in the dough can leave the dough and soak into the filter paper, creating a circle of oil (oil ring) around the dough piece. The oil rings on each filter paper are measured at 2 hours, 48 hours, and 4 days. The average diameters of the rings are recorded below:

| Emulsifier Used | Diameter of Oil Ring |
|---|---|
| MDG-2, PGE, TEM | 2 hours: not evident, or zero |
| MDG-2, PGE, TEM | 48 hours: not evident, or zero |
| MDG-2, PGE, TEM | 4 days: 1 5/16" |
| MDG-3, PGE, TEM | 2 hours: 1 5/16" |
| MDG-3, PGE, TEM | 48 hours: 3" |
| MDG-3, PGE, TEM | 4 days: 4" |

It is seen that the oil rings that the dough containing MDG-2 has much less oil loss than the dough containing MDG-3. MDG-2 has a higher melting point that MDG-3, so at room temperature more of the emulsifier is in the crystalline form. Hence, MDG-2 is more effective at tying up oil in the dough, resulting in less oil to solubilize the chip material.

What is claimed is:

1. A method for reducing chip bleed in a flavor chip-containing cookie made from dough containing shortening, comprising adding to the dough from about 0.5% to about 5% based on the amount of shortening of an emulsifier which is at least about 70% crystalline at room temperature to form a stable oil-in-water emulsion, said emulsifier comprising:
   (a) from about 40% to about 100% by weight, on the basis of monoglyceride content, fatty acid mono-diglycerides having from about 35% to about 99% fatty acid monoglycerides and from about 1% to about 50% fatty acid diglycerides, wherein at least about 65% of said fatty acids are selected from the group consisting of $C_{16}$–$C_{18}$ saturated fatty acids and $C_{18}$ trans-unsaturated fatty acids and mixtures thereof;
   (b) from about 0% to about 60% by weight fatty acid esters of polyols having an average of from about 4 to about 14 hydroxyl groups, wherein from about 10% to about 66% of the hydroxyl groups are esterified, and wherein at least about 65% of said fatty acids are selected from the group consisting of $C_{16}$–$C_{18}$ saturated fatty acids and $C_{18}$ trans-unsaturated fatty acids and mixtures thereof; and
   (c) from about 0% to about 60% by weight fatty acid monoglyceride esters of polycarboxylic acids and their derivatives; selected from the group consisting of diacetylated tartaric acid esters of monoglycerides, citric acid esters of monoglycerides, succinylated monoglycerides, ethoxylated monoglycerides, lactylated monoglycerides, and mixtures thereof; wherein at least about 65% of said fatty acids are selected from the group consisting of $C_{16}$–$C_{18}$ saturated fatty acids and mixtures thereof.

2. A method according to claim 1 wherein from about 25% to about 85% of the fatty acids of the mono-diglycerides and the polyol esters are $C_{18}$ trans-unsaturated fatty acids and less than about 18% of the fatty acids of the monodiglycerides and the polyol esters are selected from the group consisting of octadecadienoic acid and octadecatrienoic acid and mixtures thereof.

3. A method according to claim 1 wherein from about 60% to about 90% of the fatty acids of the mono-diglycerides are selected from the group consisting of myristic, palmitic, stearic, and trans-octadecenoic acids, and mixtures thereof.

4. A method according to claim 3 wherein from about 10% to about 40% of the fatty acids are selected from the group consisting of myristic, palmitic, and stearic acids and mixtures thereof, and wherein from about 2% to about 25% of the fatty acids are stearic acid.

5. A method according to claim 1 wherein the polyol esters are selected from the group consisting of partial esters of polyglycerol and sucrose, and mixtures thereof.

6. A method according to claim 5 wherein the polyol esters are polyglycerol esters having an average of from about 2 to about 12 glycerol units per polyglycerol moiety, and wherein from about 10% to about 66% of the hydroxyl groups of the polyglycerol esters are esterified.

7. A method according to claim 6 wherein the polyglycerol esters have a saponification value of from about 55 to about 175, a hydroxyl value of from about 80 to about 600, and less than about 20% free polyglycerol.

8. A method according to claim 1 wherein the polycarboxylic acid esters are diacetylated tartaric acid esters of monoglycerides having an acid value of from about 60 to about 80 and a saponification value of from about 380 to about 430.

9. A method according to claim 1 wherein the emulsifier comprises from about 40% to about 90% mono-diglycerides, from about 5% to about 55% fatty acid esters of polyols, and from about 5% to about 55% monoglyceride esters of polycarboxylic acids and their derivatives.

10. A method according to claim 1 wherein the cookie is a crumb-continuous cookie having distributed therein discrete regions of storage-stable crisp texture containing readily crystallizable sugar, and discrete regions of storage-stable chewy texture containing crystallization-resistant sugar.

11. A method according to claim 10 wherein in the regions of crisp texture the fatty acid mono-diglycerides comprise from about 70% to about 100% of the emulsifier.

12. A method according to claim 10 wherein in the regions of chewy texture the fatty acid mono-diglycerides comprise from about 50% to about 80% of the emulsifier.

13. A method according to claim 10 wherein in the regions of crisp texture the fatty acid esters of polyols comprise from about 0% to about 30% of the emulsifier.

14. A method according to claim 10 wherein in the regions of chewy texture the fatty acid esters of polyols comprise from about 10% to about 30% of the emulsifier.

15. A method according to claim 10 wherein in the regions of chewy texture the monoglyceride esters of polycarboxylic acids are diacetylated tartaric acid esters of monoglycerides, and wherein said esters comprise from about 10% to about 30% of the emulsifier.

16. A method according to claim 10 wherein in the regions of crisp texture the emulsifier is selected from the group consisting of:
 (a) said fatty acid mono-diglycerides;
 (b) said fatty acid esters of polyols; and
 (c) mixtures of (a) and (b);
and in the regions of chewy texture the emulsifier comprises by weight:
 (a) from about 40% to about 100% of said fatty acid mono-diglycerides;
 (b) from about 0% to about 60% of said fatty acid esters of polyols; and
 (c) from about 0% to about 60% of said fatty acid monoglyceride esters of polycarboxylic acids and their derivatives.

* * * * *